(12) United States Patent
Piper (10) Patent No.: US 8,199,538 B2
(45) Date of Patent: Jun. 12, 2012

(54) SWITCHED MODE POWER SUPPLY WITH IMPROVED CURRENT SENSING

(75) Inventor: Johan Piper, Comberton (GB)

(73) Assignee: Cambridge Semiconductor Limited (GB)

( * ) Notice: Subject to any disclaimer, the term of this patent is extended or adjusted under 35 U.S.C. 154(b) by 436 days.

(21) Appl. No.: 12/470,016

(22) Filed: May 21, 2009

(65) Prior Publication Data

US 2009/0290390 A1    Nov. 26, 2009

(30) Foreign Application Priority Data

May 23, 2008    (GB) .................................. 0809374.2

(51) Int. Cl.
*H02M 3/335* (2006.01)
(52) U.S. Cl. ................ 363/21.18; 363/21.13; 363/21.16
(58) Field of Classification Search ............... 363/21.12, 363/21.13, 21.16, 21.18, 21.01, 97
See application file for complete search history.

(56) References Cited

U.S. PATENT DOCUMENTS

| | | | |
|---|---|---|---|
| 5,218,521 A | 6/1993 | Augier | |
| 5,463,662 A | 10/1995 | Sutterlin et al. | |
| 6,842,350 B2 | 1/2005 | Yamada et al. | |
| 6,900,995 B2 | 5/2005 | Muegge et al. | |
| 6,977,824 B1 | 12/2005 | Yang et al. | |
| 7,016,204 B2 | 3/2006 | Yang et al. | |
| 7,288,924 B2 | 10/2007 | Trandafir et al. | |
| 7,342,812 B2 | 3/2008 | Piper et al. | |
| 7,525,823 B2 | 4/2009 | Piper et al. | |
| 2004/0196936 A1 | 10/2004 | Kawama et al. | |
| 2005/0285587 A1 | 12/2005 | Yang et al. | |
| 2006/0034102 A1 | 2/2006 | Yang et al. | |
| 2006/0077697 A1 | 4/2006 | Yang | |
| 2006/0285365 A1 | 12/2006 | Huynh et al. | |
| 2007/0274106 A1* | 11/2007 | Coulson et al. | ............ 363/21.12 |
| 2008/0007982 A1* | 1/2008 | Piper et al. | ...................... 363/97 |

FOREIGN PATENT DOCUMENTS

| | | |
|---|---|---|
| EP | 1835605 A2 | 9/2007 |
| GB | 2433654 | 6/2007 |
| GB | 2438464 | 11/2007 |
| GB | 2438465 | 11/2007 |
| GB | 2439997 | 1/2008 |
| GB | 2439998 | 1/2008 |
| WO | WO-2006/067522 A2 | 6/2006 |
| WO | WO-2006/067523 A2 | 6/2006 |
| WO | WO-2007/041897 A1 | 4/2007 |
| WO | WO-2007/135452 A1 | 11/2007 |

* cited by examiner

*Primary Examiner* — Harry Behm
(74) *Attorney, Agent, or Firm* — Schwegman, Lundberg & Woessner, P.A.

(57) ABSTRACT

We describe a switch mode power supply (SMPS) current regulation system comprising: a current sense signal input sensing a primary current of the SMPS; a voltage sense input to receive a voltage sense signal from a primary or auxiliary winding; a switch drive signal input to receive a drive signal; a timing signal generator coupled to said voltage sense input and to said drive signal input to generate a timing signal T0 indicating a duration of a period for which current is flowing through said primary winding and a timing signal T1 indicating a duration of a period for which current is flowing through said secondary winding; and a regulator to provide an output current regulation signal responsive to an average of the current sense signal multiplied by a ratio of T1 to T0, and wherein T0 and/or T1 are generated responsive to the voltage or current sense signal.

18 Claims, 8 Drawing Sheets

SWITCHED MODE POWER SUPPLY WITH IMPROVED CURRENT SENSING

RELATED APPLICATIONS

This patent application claims the benefit of priority, under 35 U.S.C. Section 119, to United Kingdom Patent Application No. 0809374.2, filed on May 23, 2008, which is incorporated herein by reference in its entirety.

FIELD OF THE INVENTION

This invention relates to methods and apparatus for regulating the output current in a switch mode power supply (SMPS), and in particular to improving the accuracy of primary side sensing for such regulation.

BACKGROUND TO THE INVENTION

Many SMPS applications require the output current to be either limited to or maintained at a particular value. It is desirable to employ primary-side sensing for a number of reasons, for example isolation. Many techniques have been described for primary-side voltage sensing—see, for example, our earlier published applications GB 2,438,464 and GB 2,438,465 (incorporated by reference) as well as, for example, U.S. Pat. No. 6,900,995 (iWatt) but it is less common to employ primary-side sensing for output current regulation.

We have previously described primary-side output current sensing/regulation techniques in GB 2,439,997 (U.S. Pat. No. 7,342,812), GB 2,439,998 (U.S. Pat. No. 7,525,823) and EP 1835605—hereby incorporated by reference—and we now describe techniques for improving the accuracy of such output current sensing/regulation, broadly speaking by improving the accuracy/reliability of the timing signals involved.

Other background prior art can be found in US2006/0285365, WO2007/041897, U.S. Pat. Nos. 6,977,824, 6,842,350, US 2006/034102, US 2005/285587, US 2006/077697, US 2004/196936, U.S. Pat. Nos. 5,218,521, 7,288,924, 5,463,662 and 7,016,204.

SUMMARY OF THE INVENTION

According to a first aspect of the invention there is therefore provided a switch mode power supply (SMPS) current regulation system, said SMPS including a transformer with at least a primary winding coupled to an input of the SMPS and a secondary winding coupled to an output of the SMPS, the SMPS having a switching device to switch power to said primary winding responsive to a drive signal, the current regulation system comprising: a current sense input to receive a current sense signal sensing a current on said primary winding of said transformer; a voltage sense input to receive a voltage sense signal from said primary winding or an auxiliary winding of said transformer; a drive signal input to receive said drive signal; a timing signal generator coupled to said voltage sense input and to said drive signal input to generate a first timing signal indicating a duration of a period for which current is flowing through said primary winding and a second timing signal indicating a duration of a period for which current is flowing through said secondary winding, wherein one or both of said first timing signal and said second timing signal are generated responsive to said voltage sense signal; and an output current regulator coupled to said current sense input and to said timing signal generator to provide an output current regulation signal responsive to an average of said current sense signal multiplied by a ratio of said second timing signal to said first timing signal.

In embodiments, by improving the timing signals and reducing glitches a more accurate estimate of the desired output current may be produced.

However, as illustrated later an estimate of the output current need not be produced explicitly in order to produce an error signal for regulating the output current of the SMPS. In preferred implementations both the first and second timing signal are generated in response to the voltage sense signal, but some benefit is obtainable by generating only one signal in this way—for example, as described below, the first timing signal may simply be generated by a connection to the drive signal.

Broadly speaking the first timing signal (T0) indicates when the primary side switching device is turned on, and hence a first approximation of T0 is to use the drive signal applied to this switching device. However the actual turn-on and turn-off of the switching device can be delayed because of electrical interaction between the switching device and the circuitry in which it operates and, in particular, the switching device may not switch off cleanly. Thus in preferred embodiments the timing signal generator generates at least one edge of the first timing signal, preferably the falling or trailing edge of the first timing signal, from the voltage sense signal. Alternatively the rising or in particular the trailing edge of T0 may be generated by the timing signal generator from the primary side current sense (CS) signal. In this way the trailing edge of T0 is delayed with respect to the trailing edge of the drive signal and thus corrects for non-instantaneous turn-off of the switching device. The trailing edge of T0 can be used to generate the leading edge of the second timing signal (T1) or one or more edges of T0 can be generated from the CS and/or the VS signal waveforms. In embodiments the timing signal generator may also be configured to generate a leading edge of the first timing signal from the voltage sense signal (or the current sense signal) such that this leading edge is later than a turn-on time of the drive signal. This helps to take account of a delay in the turn-on of the primary side switching device.

One approximation which can be used to generate the second timing signal is to detect zero-crossings of the sensed, flyback voltage. This provides a good measurement of the start of T1 but the end of T1 is masked by the natural oscillation of the transformer and T1 will therefore be too long. It is therefore desirable to identify the end of T1 with greater accuracy, but a difficulty with this is that the flyback signal rings during the period of secondary-side current conduction, particularly because of the leakage inductance of the transformer. This ringing can produce glitches in T1, resulting in a noisy signal, and a too-low average of T1 (some preferred control techniques, described later, employ an averaged T1). We therefore describe a technique to produce a second timing signal (T1) which is substantially glitch-free by using zero-crossings of the flyback voltage as a base signal, measuring the natural oscillation of the transformer and then correcting the base signal to produce an accurate representation of T1. As noted later it is not essential to use zero-crossings of the flyback voltage: other voltage level crossings, turning points or other fiducial points on the sensed voltage waveform or on the current sense signal waveform may be employed. Alternatively, a signal other than the flyback voltage may be used to generate the base signal, so long as it contains a robust feature reliably occurring after the true knee point and before any new false knee triggering events. Optimum selection of the origin of the base signal depends on the particulars of the system and/or application.

Thus in some preferred embodiments of the SMPS current regulation system the timing signal generator identifies a fiducial point on the voltage sense signal and generates an offset signal (NEGT) indicating a timing difference between this and a flux reset point of the transformer. This is then used to generate a trailing edge of T1, by offsetting the timing of the fiducial point (indicated by a flyback signal, FLYBK) by the timing difference indicated by the timing offset signal. In embodiments signal T1 is a bipolar signal and the offsetting is performed by adding an inverted version of the timing offset signal to a base signal having a timing determined by the flyback (FLYBK) signal.

In embodiments the timing signal generator comprises a knee-detector to identify a knee point on the voltage sense signal for use in generating the second timing signal. The knee-detector may comprise a decaying or leaky peak detector or, for example, a comparator. However such an arrangement will produce glitches, identifying false knee points as well as the real knee point. Preferably, therefore, the timing signal generator includes a mechanism to ignore such false knee points. In embodiments this comprises a dual slope integrator triggered by each detection of a knee point, whether the knee point is real or false. At each trigger event the integrator integrates in a first direction, for example upwards. The timing signal generator includes a system, for example a comparator, to detect a fiducial point on the voltage sense waveform following the real knee point, for example a zero-crossing of the voltage sense waveform. Detection of this fiducial point triggers the dual slope integrator to integrate in the opposite direction, for example downwards. In this way the dual slope integrator is reset by each successive knee point identification, whether real or false except for the final, real knee point identification. By determining when the dual slope integrator integrates back down to its starting value the real knee point can be identified, albeit at a point offset later in time from the real knee point. However this time offset can be determined by the duration of the integration in the opposite direction, for example downwards and hence this can be used to offset a timing of the fiducial point, and hence determine a value indicating a timing of the real knee point. It is convenient for the up and down slopes of the integrator to be substantially the same, in which case the integrator will integrate back down towards the point (voltage level) from which it started, although this is not essential and different up/down slopes and start/end points may be employed.

The skilled person will understand that use of a dual slope integrator is a convenient and straightforward approach to generating a suitable timing offset signal, but it will also be understood that alternative techniques may be employed, for example, digitally timing an interval between the real knee point and a fiducial point on the voltage sense waveform following this real knee point. The skilled person will further understand that embodiments of the above-described SMPS current regulation system may be implemented in either analogue or digital circuitry or a combination of the two or even using a microcontroller.

In a related aspect the invention provides a method of estimating the output current of a switch mode power supply (SMPS) using primary-side sensing, said SMPS including a transformer with at least a primary winding coupled to an input of the SMPS and a secondary winding coupled to an output of the SMPS, the SMPS having a switching device to switch power to said primary winding responsive to a drive signal, the method comprising: sensing a current (CS) through said primary winding whilst said switching device is on; determining a first time (T0) representing a time for which said current is flowing through said primary winding; determining a second time (T1) representing a time for which said current is flowing in said secondary winding; and determining an estimate of said output current from said second current, said first time and said second time; and further comprising: sensing a secondary side voltage (VS) using said primary winding or an auxiliary winding of said transformer; and wherein at least one of said determining of said first time and said second time comprises correcting a value of a said time responsive to said sensed secondary side voltage (VS).

The determining of an estimate of the output current may be either explicit or implicit within a current regulation system of the SMPS.

As described above, the first time (T0) may be corrected by extending this from the end of the drive signal to a time when the switching device has actually stopped conducting, preferably by sensing the secondary-side voltage using primary-side sensing, or by sensing the primary side current directly. Preferably the method further comprises correcting the second time (T1) by detecting a knee point on the sensed secondary-side voltage, ignoring false knee points by determining a longer time than that identified by the real knee point, by identifying a point after the real knee point, and then effectively correcting backwards to correct time (T1). Again, in preferred embodiments, this comprises dual slope integrating, integrating a first substantially fixed value from a detected knee point until a fiducial point on a sensed waveform and then integrating a second substantially fixed value (preferably substantially the same as the first) to determine how long it takes to get back to the starting value, using this time to offset, effectively backwards, the time of the fiducial point back to the real knee point. In embodiments this offsetting may be performed by using a bipolar value for T1 and adding a negative value proportional to the offset time determined by the integrating.

The invention further provides a method of estimating a conduction time of a secondary winding of a transformer in an SMPS, the method inhibiting false triggering, the method comprising: detecting an end of said conduction time by detecting a knee of a secondary side voltage decay, wherein said knee detection detects both a real knee and one or more false knees; detecting substantially unambiguously a second point in a waveform of said secondary side voltage subsequent to said real knee; and using said second point detecting to inhibit detection of said false knees to inhibit false triggering.

The invention still further provides a method of estimating a conduction time of a primary winding of a transformer in an SMPS to compensate for non-instantaneous turn-off of a primary-side switching device, the method comprising: using a control signal to said switching device to determine said conduction time, and extending said determined conduction time until determining that a sensed current through said primary winding has reached substantially zero.

In some preferred embodiments the determined end of the conduction time of the primary-side switching device is used to initiate the estimate of the conduction time of the secondary winding of the transformer of the SMPS.

The invention further provides a switch mode power supply including a current regulation system as described above and/or comprising means to implement a method of estimating an output current or conduction time of a primary or secondary winding of a transformer of an SMPS as described above.

Embodiments of the above-described techniques may be employed with a wide variety of SMPS topologies including, but not limited to, a flyback converter and a direct-coupled boost converter. The transformer may comprise a conventional transformer or an auto-transformer, and the secondary-side voltage may be sensed either on the primary winding (using a potential divider if this voltage is high) or using an auxiliary winding of the transformer.

BRIEF DESCRIPTION OF THE DRAWINGS

These and other aspects of the invention will now be further described, by way of example only, with reference to the accompanying figures in which:

FIGS. 7a to 7c show alternative example implementations of the current model (CM) of the SMPS of FIG. 1a; and FIGS. 8a and 8b show alternative example implementations of the control module (CTRL) of the SMPS of FIG. 1a.

DETAILED DESCRIPTION OF PREFERRED EMBODIMENTS

Broadly speaking we will describe techniques for estimating and regulating current on the secondary side of a transformer in a switched mode power supply (SMPS) using primary side sensing. This is dependent on accurate timing. We will describe techniques which enable the timing of the 'knee' point on the fly-back signal—that is the point when the current on the secondary side has reached zero—to be determined accurately despite using a knee-point detection method that is noisy. Among other things, the techniques we describe produce an accurate estimate of the time when the secondary side is conducting by generating a timing signal from the rising edge of flyback signal to the last edge of the 'knee'-point signal before the falling edge of the flyback signal.

SMPS Overview

Figure 1A:
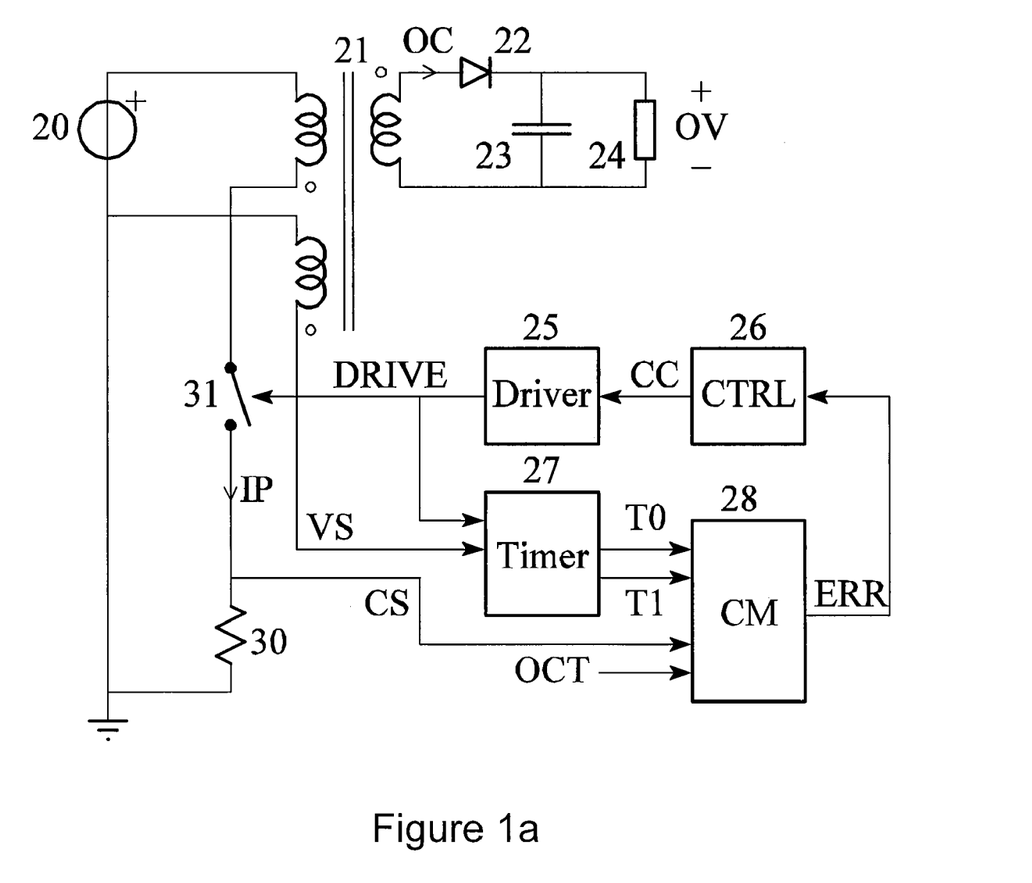
FIGS. 1a to 1c show, respectively, an example of a switch mode power supply incorporating an SMPS output current regulation system according to an embodiment of the invention, an alternative current sensing arrangement for the SMPS of FIG. 1a, and an alternative voltage sensing arrangement for the SMPS of FIG. 1.

Referring to FIG. 1a this shows a simplified block diagram of a single-switch flyback SMPS. A DC source 20 is connected to the primary winding of a transformer 21 in series with a primary side switch 31 and a current sensing resistor 30. The secondary winding of the transformer 21 is connected to an output diode 22 in series with a capacitor 23. A load 24 is connected across the output capacitor 23. An auxiliary winding on the transformer 21 is connected between the negative terminal of the DC supply 20 and the timer 27 generating a voltage-sense (VS) signal. The primary current IP produces a voltage across resistor 30, generating a primary winding current-sense (CS) signal. The driver 25 controls the on-times and the off-times of the switch 31 with the DRIVE signal.

The timer block 27 generates two timing signals, T0 and T1, by sensing the DRIVE, and VS or CS signals. T0 represents the charge-time, i.e. the time when a current is flowing through the primary side of the transformer 21. T1 represents the discharge-time, i.e. the time when a current is flowing through the secondary side of the transformer 21.

The signals T0, T1 and CS, are used in a current model (CM) block 28 to produce an error signal ERR. A (constant) output current target (OCT) signal represents the target output current of the secondary winding.

The ERR signal represents a difference between OCT and an output current model (OCM) signal which estimates the output current of the SMPS (an OCM signal may or may not be produced explicitly in the SMPS). The ERR signal is used in the control block 26 to control the driver 25 in such a way that the error signal ERR converges towards zero (so that the OCM signal converges towards OCT).

Figure 1B:
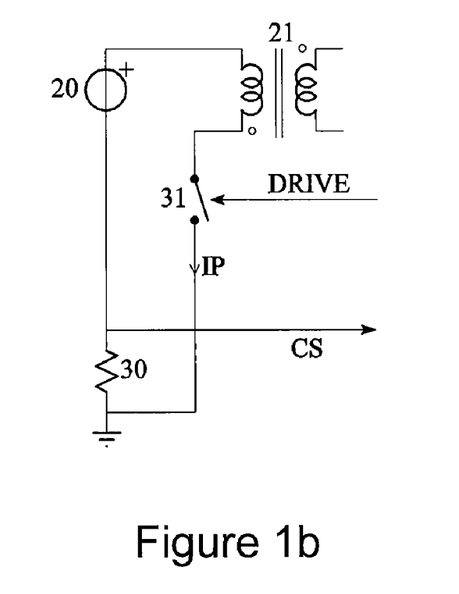
Figure 1C:
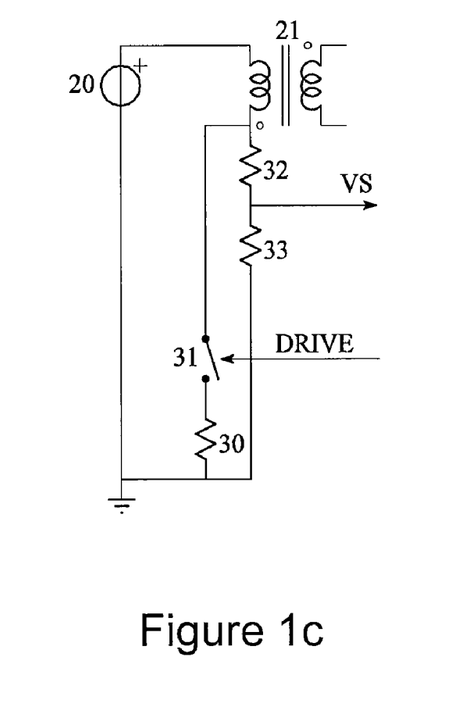

One alternative way to sense the current is to put the current sensing resistor 31 in the return path, as shown in FIG. 1b. One alternative way to sense the voltage is to use a resistive divider (resistors 32 and 33) on the primary, as shown in FIG. 1c, thus eliminating the auxiliary winding.

Timer-simple

Figure 2:
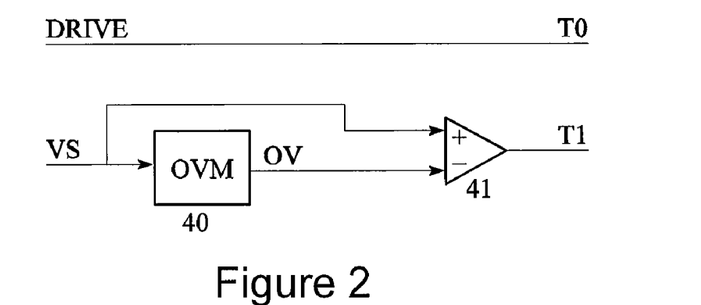
FIG. 2 shows an example implementation of a timing signal generator which could be improved by more accurate generation of timing signals T0 and T1.

FIG. 2 shows one example implementation of the timer block 27. In this example the signal DRIVE is used directly for generating T0 and the reflected secondary-side voltage sensed on the auxiliary (or primary) winding of transformer 21 is used to generate the discharge-time signal T1. It is preferable to employ primary-side sensing for the discharge time since it is desirable for only primary-side sensing to be employed. One way in which the discharge time may be determined uses an output voltage model (OVM) block 40 which has an output, OV, which approximates the output voltage of the SMPS and which can be compared with the sensed voltage signal VS by comparator 41 to generate signal T1. In general, an SMPS controller which incorporates primary-side sensing for output voltage regulation will already include some form of output voltage model. An alternative to the use of an output voltage model per se is simply to compare the sensed voltage waveform with a reference level in order to generate the discharge-time signal T1. However in order to improve the current regulation better techniques for the generation of the important timing signals T0 and T1 are desirable, as explained below.

Output Current Model

The equation for estimating the output current is:

$$OCM = n\frac{<CS><T_1>}{<T_0>} \qquad \text{Equation 1}$$

where <X> denotes the low-pass filtered (average) signal X. CS is the primary side current (or a primary side current sense signal), T0 the time when the primary side of the transformer is conducting (charge time) or a signal dependent on this, T1 the time when the secondary side of the transformer is conducting (discharge time) or a signal dependent on this, and n a constant depending on, for example, the transformer turns ratio and the value of resistor 30. Averages may be taken over one or more SMPS periods or instantaneous values T1 and T0 may be used instead of average values to estimate the output current.

Equation 1 may be used to implement an error function, the results of which can be used to control the output current of the SMPS. It can be seen from Equation 1 that accurate estimation of the current on the secondary side of a transformer using primary side sensing is dependent on accurate timing.

Timer-improved

Figure 3A:
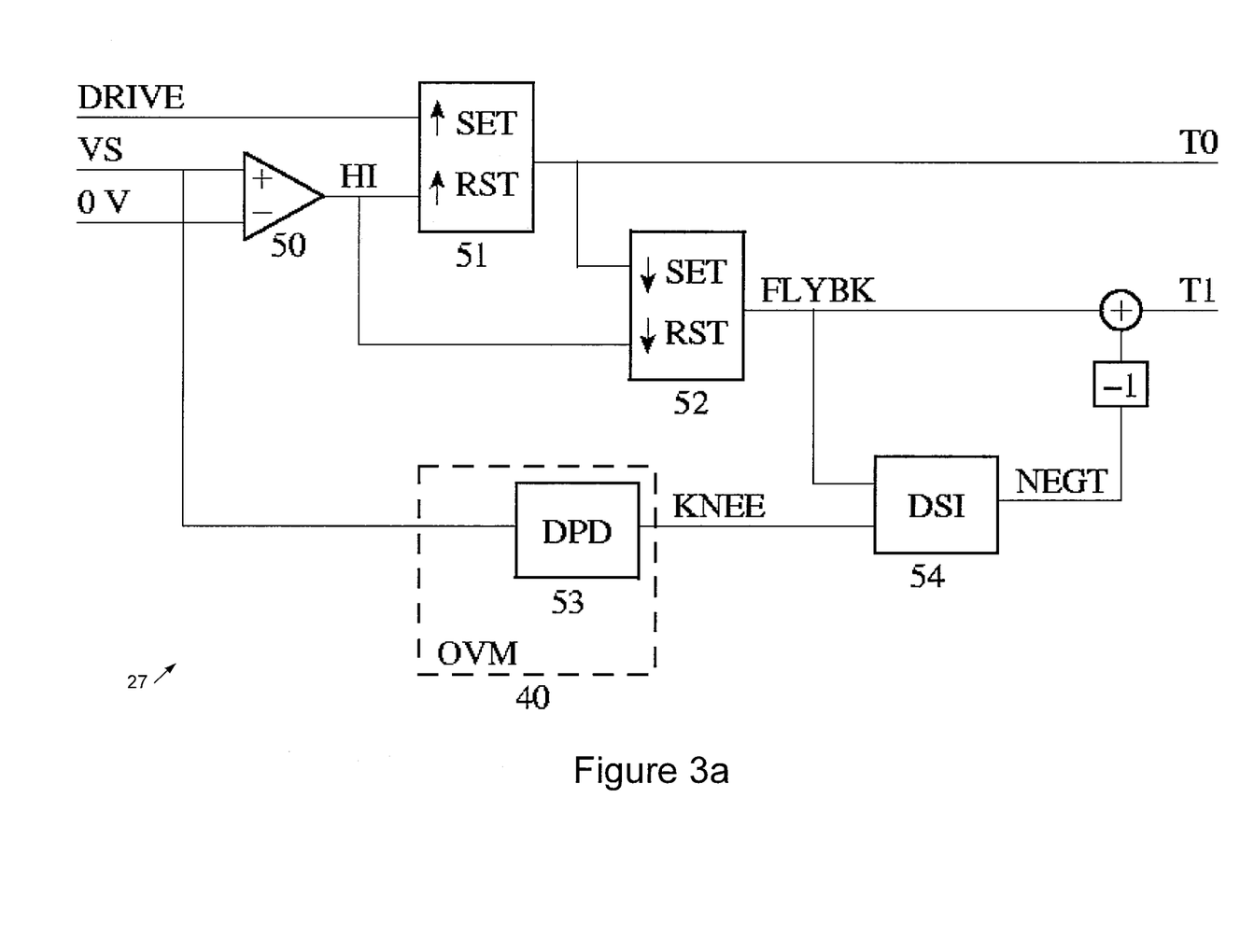
FIGS. 3a and 3b show a timing signal generator (timer) for the SMPS of FIG. 1a according to a first and second embodiments of the invention respectively.
Figure 3B:
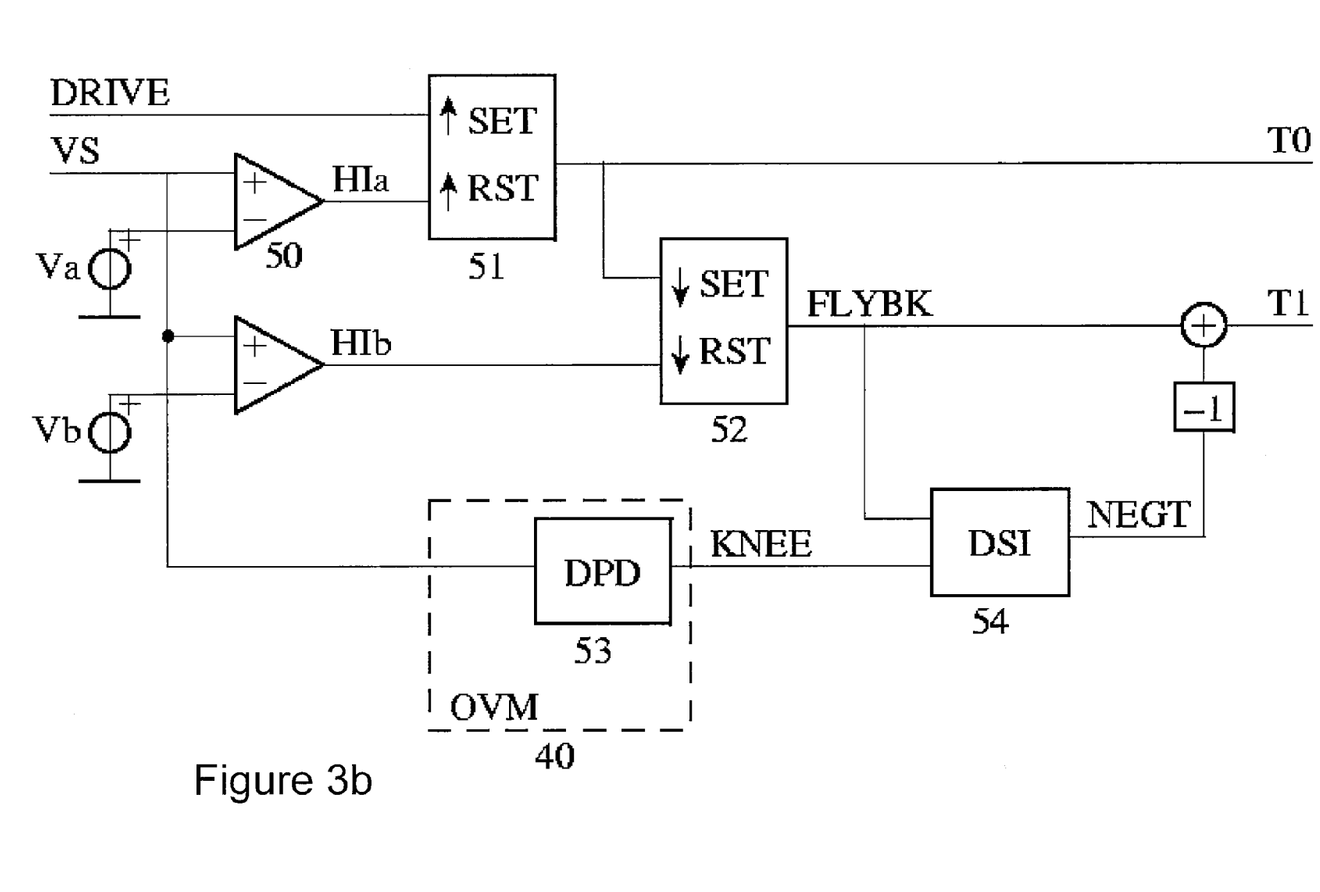

A block diagram of an improved timer module 27, which enables improved output current regulation, is shown in FIG. 3*a*; a variant implementation is shown in FIG. 3*b*. It is also helpful to refer to the waveforms of FIG. 6, which illustrate the operation of the timer in the context of the SMPS.

Timing signal T0 should represent the time when the primary side switch is conducting current and charging the transformer. However because the turn-off of the switching device 31 is not instantaneous, especially when using a high-voltage BJT (bipolar junction transistor) as a switch, the DRIVE signal is too short. To address this problem, in embodiments a comparator 50 is used to generate a signal HI when the voltage sense signal VS>0 volts (although an alternative reference voltage level may be employed), and T0 is then stretched until the rising edge of the HI signal. The implementations shown in FIG. 3 use a latch 51 which is set by the rising edge of DRIVE and reset by the rising edge of HI. The output of the latch 51 provides timing signal T0. Alternatively comparator 50 may employ current sense signal CS, rather than voltage sense signal VS, to generate the rising edge of the HI signal. In the latter case T0 is stretched until the falling edge of the CS signal.

Timing signal T1 should represent the time when the secondary side is conducting and discharging the transformer. An accurate timing of the end of the discharge-time is provided by the "knee-point" of the VS signal. This signal can be obtained a decaying-peak detector (DPD) 53. We have previously described a similar decaying or leaky-peak detector, albeit in a different context, in WO 2007/135452 (U.S. Ser. No. 11/445,473), which description is hereby incorporated by reference. The knee-detect output signal of the leaky-peak detector, KNEE, is a noisy signal as it detects all the "knees" on a noisy voltage sense (VS) signal. One could use KNEE directly to generate T1 but some preferred implementations of the output current model block (see below) use an average value of T1 and glitches on T1 would cause the estimated output current OCM to be too low.

Figure 6:
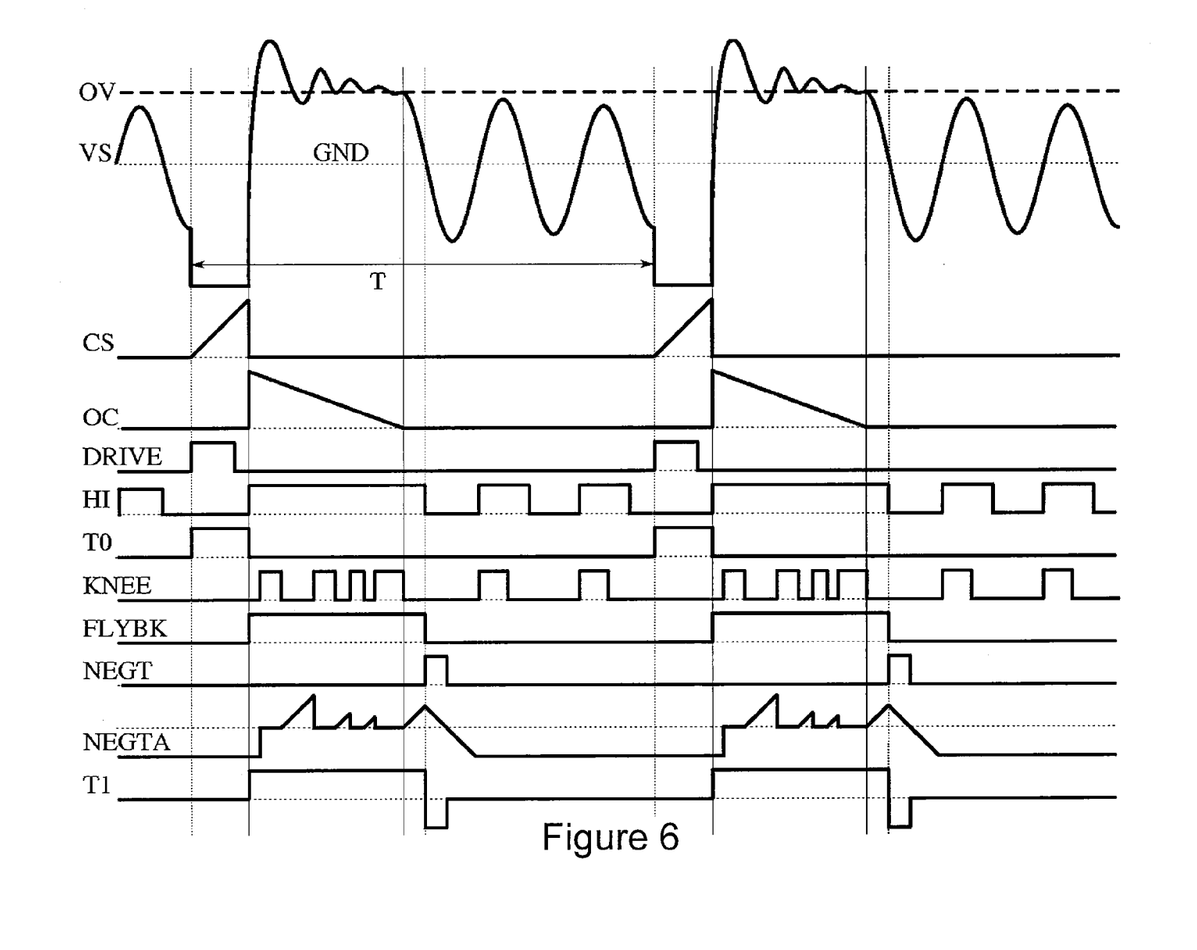
FIG. 6 shows waveforms illustrating the operation of the SMPS of FIG. 1a including the timing signal generator of FIG. 3.

Therefore in preferred embodiments a more accurate measure of timing signal T1 is generated from the difference of two intermediate signals, using T1=FLYBK−NEGT. Referring again to FIG. 6, FLYBK is high from the falling edge of T0 to the first falling edge of HI. A signal NEGT is generated which is high for an amount of time equal to the difference between the true transformer reset point (at the "knee point" on the VS waveform) and the zero-crossing point on the VS waveform. As can be seen in FIG. 6, in embodiments T1=FLYBK−NEGT is bipolar and its average value represents the length of time during which the secondary side of the transformer is conducting.

The implementation shown in FIG. 3*a* uses a latch 52 to generate the FLYBK signal. The latch 52 is set by the falling edge of T0 and reset by the falling edge of HI. A dual-slope integrator DSI 54 generates NEGT from FLYBK and KNEE, as explained in more detail below.

Broadly speaking, therefore the estimation of timing signal T1 employs: i) detection by some means of the end point of secondary side current conduction—the 'knee point'—where those means can be susceptible to false early triggering due to noise, parasitic impedance-induced oscillations or other disturbances; ii) detection by some means of a later, less ambiguously detected, event in the sensed waveform, for example a first or other zero crossing or turning point in the oscillatory portion of that waveform, subsequent to the end of secondary side current conduction; and then iii) use of the elapsed time between the events detected in (i) and (ii) to determine an accurate, substantially noise-immune value for T1.

FIG. 3*b* shows a preferred embodiment of a timing generation module. Here the comparator 50 has been split into comparators 50*a* and 50*b*, each referenced to an individual voltage, Va and Vb respectively. This arrangement provides greater flexibility and accuracy in independently setting the trigger values of the sensed waveforms which will in turn determine the falling edges of T0 and T1.

Broadly speaking the leading and trailing edges on T0 and T1 signals can be triggered by rising or falling edges of any suitable primary side signals, including the VS and CS waveforms, or by signals derived therefrom. For example, the falling edge of T0 and/or the rising edge of T1 can be determined by the time when the CS voltage returns to ground. Further, the inputs to the latches 51 and 52 can be delayed by a fixed delay to accommodate for fixed delay in the system.

Decaying Peak Detector

Figure 4:
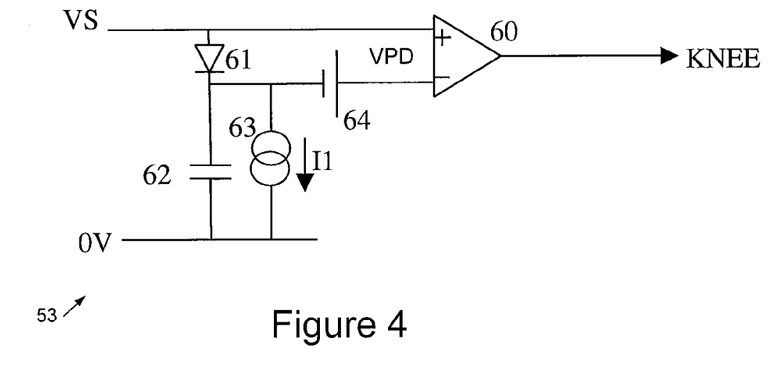
FIG. 4 shows an example of a decaying peak detector (behavioural model) suitable for use with the timing signal generator of FIG. 3.

FIG. 4 shows an example implementation of the Decaying Peak Detector (DPD) 53 of FIGS. 3*a* and 3*b*.

The Decaying Peak Detector has the sensed voltage signal as an input and VPD tracks the VS waveform except when the slope of VS exceeds a certain (negative) value, at which point the VS and VPD waveforms separate from each other. The KNEE signal from the DPD is active when the VPD signal is tracking the VS signal, that is when VS is increasing or "updating" VPD, going inactive on detection of a real or false knee in VS.

In the example behavioural model shown in FIG. 4 diode 61 and capacitor 62 together comprise a peak detector. Preferably a voltage source 64 adds a small DC offset compensating for the forward voltage drop of diode 61. Current generator 63 (here a current sink) discharges the voltage on the capacitor 62, defining the maximum negative slope of the decay on VPD, so that comparator 60 makes the KNEE signal active if the VS (negative slope) is greater than or equal to the voltage (negative slope) on capacitor 62. In embodiments the rate of discharge of capacitor 62 by current sink 63 may be chosen according to the implementation to approximately follow the sensed secondary side voltage, providing an approximate tangent to this voltage prior to its oscillatory or resonant portion. Optionally the DPD 53 may be reset, for example during T0, by opening a switch (not shown) in series with the VS input and closing a switch (not shown) across capacitor 62.

Dual Slope Integrator

Figure 5:
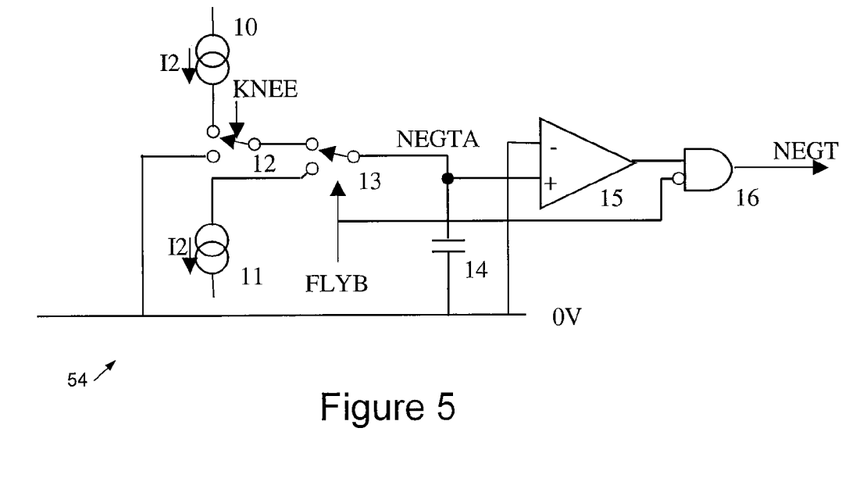
FIG. 5 shows an example of a dual-slope integrator (behavioural model) suitable for use with the timing signal generator of FIG. 3.

FIG. 5 shows an example implementation of the Dual Slope Integrator (DSI) 54 of FIGS. 3*a* and 3*b*.

As mentioned above, a signal NEGT is generated which is high for an amount of time equal to the time from the last falling edge of KNEE to the falling edge of FLYBK. In the implementation we describe generation of NEGT is based on an analogue dual-slope integrator, but other techniques may also be employed. Thus the dual slope integrator 54 of FIG. 5 generates NEGT from KNEE and FLYBK.

Referring to FIG. 5, capacitor 14 acts as an integrator and is either (i) charged by current source 10, (ii) discharged by current source 11, or (iii) reset to GND by the action of switches 12 and 13. The waveforms can be found in FIG. 6. In embodiments current sources 10 and 11 are sourcing the substantially the same current so that the rate of charging and discharging is the substantially same.

Referring to FIGS. 5 and 6, in operation FLYBK goes high and NEGT is forced low by blanking gate 16. When KNEE goes low switch 12 connects capacitor 14 to current source 12 and NEGTA ramps upwards. The initial glitches on KNEE cause inconsequential glitches on NEGTA since NEGT is blanked by gate 16. After some initial glitches, KNEE goes high again before the true knee point and NEGTA is reset to ground. Then KNEE goes low at the true knee point and NEGTA is released and ramps upwards. When FLYBK finally goes low switch 13 connects capacitor 14 to current source 11, NEGTA starts ramping down and NEGT goes high. When NEGTA reaches its starting value, here ground, NEGT goes low by the action of comparator 15. Since the charge rate and the discharge rate is the same, NEGT is high by the same amount of time as the time from the last falling edge of KNEE to the falling edge of FLYBK.

Current Model Block

We now give example implementations of current model (CM) block 28. As illustrated this generates an error function signal ERR representing the difference between an estimated output current of the SMPS and a desired target output current. For details of example implementations reference may be made to the applicant's patent applications GB2439997 and GB2439998, hereby incorporated by reference.

Figure 7A:
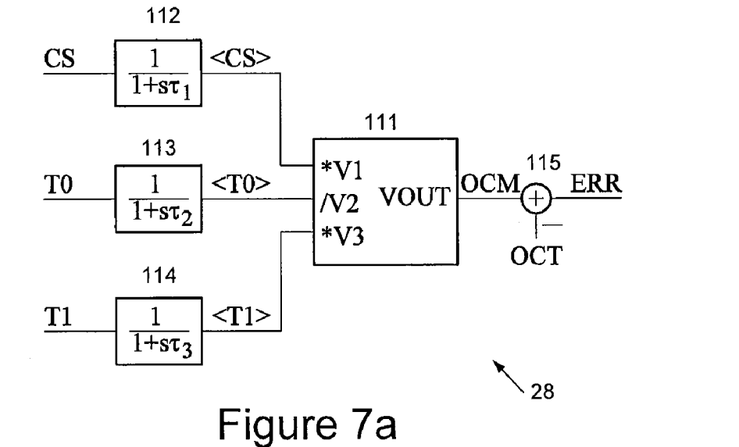

A first example implementation of such an error function is shown in FIG. 7a. The error function for the first implementation (for simplicity disregarding n) is:

$$ERR = \frac{<CS> \cdot <T1>}{<T0>} - OCT \qquad \text{Equation 2}$$

In this implementation, CS, T0, and T1 are fed through respective low-pass filters 112, 113 and 114, to generate the averages of the three signals: <CS>, <T1>, and <T0>. The averaged signals are used in a multiplier/divider 111 to produce OCM. OCM is then compared to the output current target OCT in subtracter 115 to produce the error signal ERR. As mentioned previously <T1> and <T0> may be replaced by non-averaged T1 and T0 and then low-pass filters 113 and 114 may be omitted, but where as described above a bipolar T1 is employed averaging automatically "corrects" the value of T1 for the time offset between the true knee point and the first zero-crossing afterwards.

Figure 7B:
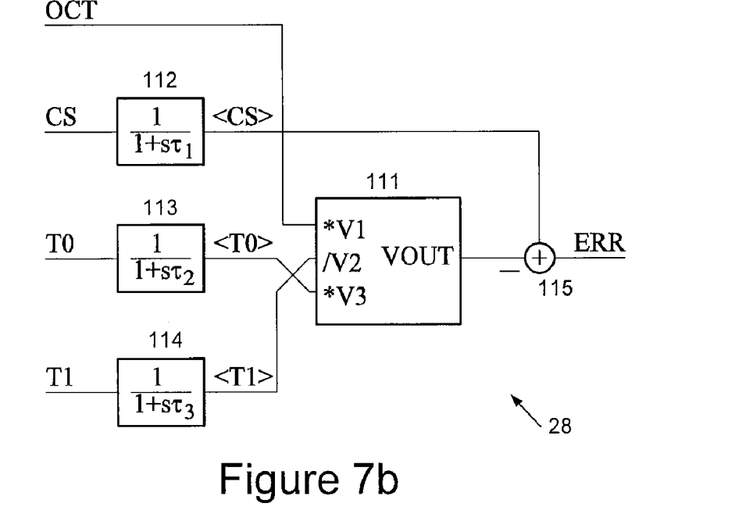

A second example implementation of such an error function is shown in FIG. 7b. By multiplying the right-hand side of Equation 2 by <T0>/<T1> the error signal becomes:

$$ERR = <CS> - \frac{OCT \cdot <T0>}{<T1>} \qquad \text{Equation 3}$$

The difference in this implementation that <T0> and <T1> have been switched on the input of the multiplier/divider 111. Also OCT and <CS> have been switched. In this implementation the signal path carrying OCT is subtracted from <CS> in subtracter 115. The ERR signal in this implementation will differ in magnitude to that of the first example implementation but this does not adversely affect the operation of the surrounding circuitry. Again, <T1> and <T0> can be replaced by T1, and T0, but with the same comment as above.

Figure 7C:
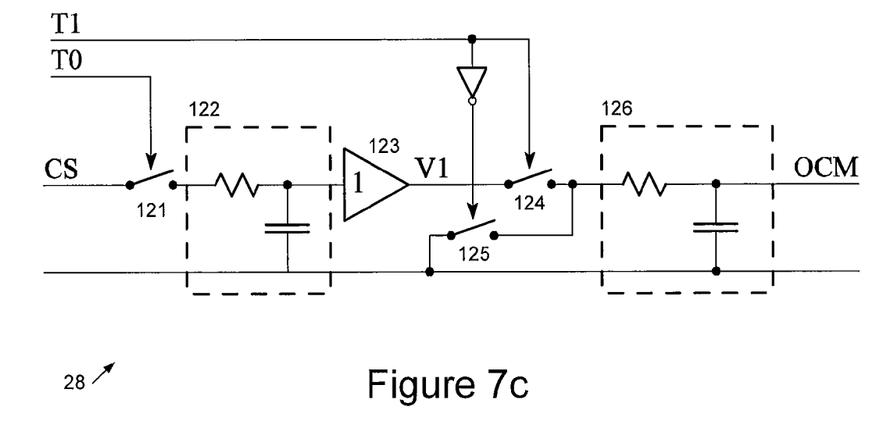

FIG. 7c, which is taken from GB2439997, shows a further alternative implementation in which the CS signal is averaged during T0 in the first low-pass filter 122 (formed by a first resistor and capacitor). Note that the input of the first low-pass filter 122 is high impedance when T0 is low by the action of the switch 121. Therefore CS is averaged only when T0 is high, otherwise the voltage is held on the capacitor 122. The output signal of the first low-pass filter 122 is buffered by 123 to produce the signal V1. V1 is then multiplied by T1 over T, the total SMPS cycle period (T1 effectively providing both T1 and T) by switching the second low-pass filter 126 (formed by a second resistor and capacitor) between ground and V1. The switches 124 and 125 are turned on by T1 and the inverse of T1 respectively.

Controller

Figure 8A:
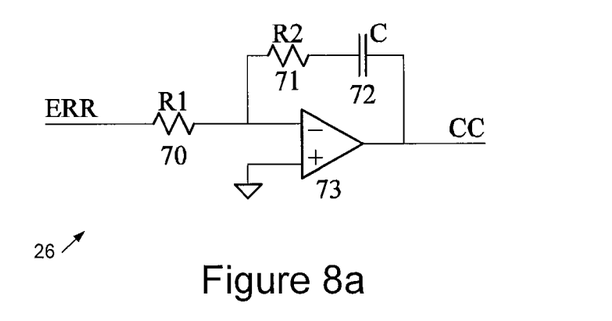
Figure 8B:
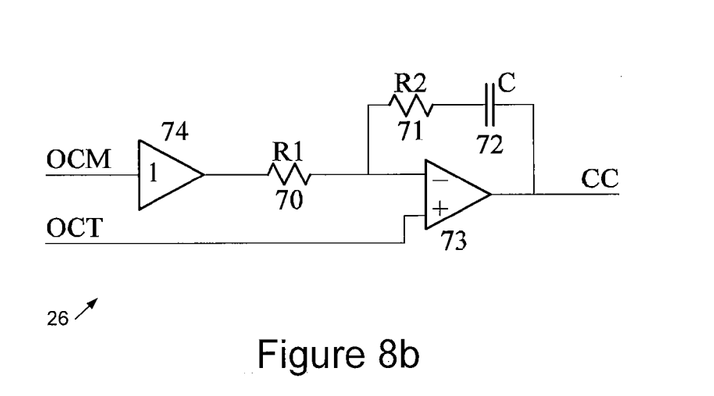

Example embodiments of the controller 26 of FIG. 1a are shown in FIGS. 8a and 8b. In FIG. 8a the controller integrates the ERR signal; in FIG. 8b the controller integrates the difference between the OCM and OCT signals. In both cases the integration is performed by action of the resistor 70, the capacitor 72, and the amplifier 73. Together they form an inverting integrator. If the output current is too high, the error voltage ERR—or the difference OCM−OCT—will be positive, and the signal CC will decrease which reduces the output power of the SMPS (and vice versa for a too low output current). In FIG. 8b the purpose of the buffer 74 is to reduce the load on the low-pass filter 126 in the current model 28.

The purpose of resistor 71 is to cancel the pole from the CM 28 by inserting a zero. This way the transfer function from OC to CC only has one dominant pole at zero frequency. The controller may be implemented without resistor 71 by replacing this with a wire. In this alternative implementation of the controller, the low-pass filter 114 in the current module CM 28 is no longer required. In effect, removing the low-pass filter 114, i.e. letting the time constant T3 go to zero, reduces the required value of the resistor 71 to zero.

Driver

The driver 25 in FIG. 1a may comprise a pulse-width and/or pulse-frequency modulator that controls the DRIVE signal. The DRIVE signal turns on and off the primary side switch 31. The width and frequency of the DRIVE signal controls the power delivered to the secondary side of the transformer 21. The input signal CC preferably controls the driver 25 such that the power delivered to the secondary side is dependent on (increases monotonically with respect to) the input signal CC. For further details reference may be made to the applicant's co-pending applications PCT/GB2005/050244, PCT/GB2005/050242, GB 0526118.5 (all of which applications are hereby incorporated by reference in their entirety).

Broadly speaking we have described techniques for generating accurate representations of timing signals used for an output current model in a primary-side sensing controller. In embodiments T0 is compensated for delays in the turn-on/off of the primary switch, and T0 edges are generated from edges on the VS, CS and/or DRIVE, with or without a fixed delay. In embodiments T1 is generated directly or indirectly from a "knee-detector" which may be, for example, a leaky-peak detector or a comparator. More particularly in embodiments T1 is generated from FLYBK and NEGT signals, where FLYBK is high from the VS signal going high from a time after the DRIVE has been turned off till the zero-crossing point on the VS waveform, and where NEGT is high for an amount of time equal to the difference between the true transformer reset point (at the "knee point" on the VS waveform) and the zero-crossing point on the VS waveform. The position of NEGT in the switching period is unimportant however NEGT is high by substantially the same amount of time as the time from the last falling edge of KNEE to the falling edge of FLYBK. In embodiments generation of NEGT can be implemented with a dual-slope integrator, which may be either analogue or digital.

Embodiments of the SMPS we describe may also include an output voltage control loop, preferably a primary-side sensing voltage control loop. We have previously described a number of suitable techniques including, for example, that of in WO 2007/135452 (U.S. Ser. No. 11/445,473) which samples the output voltage at the knee in the reflected secondary side voltage waveform (identified using a decaying peak detector to approximate a tangent to the decaying secondary side waveform), at which point because substantially no current is flowing to the SMPS output the secondary side voltage accurately reflects the output voltage of the SMPS.

We have described the operation of embodiments of the above-described output current estimation technique in the context of an example of an SMPS operating in a Discontinuous Conduction Mode (DCM), but the techniques also work in Critical Conduction Mode and in Continuous Conduction Mode (CCM) since no particular shape is assumed for the waveforms involved; instead the described signal processing employs the actual, sensed signal waveforms.

No doubt many other effective alternatives will occur to the skilled person. For example although some embodiments of the timer circuit have been described which employ a voltage sense signal to generate timing signals T0 and T1, the skilled person will appreciate that the current sense signal may alternatively be employed. It will be understood that the invention is not limited to the described embodiments and encompasses modifications apparent to those skilled in the art lying within the spirit and scope of the claims appended hereto.

The invention claimed is:

1. A switch mode power supply (SMPS) current regulation system, said SMPS including a transformer with at least a primary winding coupled to an input of the SMPS and a secondary winding coupled to an output of the SMPS, the SMPS having a switching device to switch power to said primary winding responsive to a drive signal, the current regulation system comprising:
   a current sense input to receive a current sense signal sensing a current on said primary winding of said transformer;
   a voltage sense input to receive a voltage sense signal from said primary winding or an auxiliary winding of said transformer;
   a drive signal input to receive said drive signal;
   a timing signal generator coupled to said voltage sense input and to said drive signal input to generate a first timing signal indicating a duration of a period for which current is flowing through said primary winding and a second timing signal indicating a duration of a period for which current is flowing through said secondary winding, wherein one or both of said first timing signal and said second timing signal are generated responsive to said voltage sense signal or said current sense signal; and
   an output current regulator coupled to said current sense input and to said timing signal generator to provide an output current regulation signal responsive to an average of said current sense signal multiplied by a ratio of said second timing signal to said first timing signal,
   wherein said timing signal generator is configured to generate at least one edge of said first timing signal from said voltage sense signal or said current sense signal.

2. A switch mode power supply (SMPS) current regulation system as claimed in claim 1 wherein said timing signal generator is configured to generate a trailing edge of said first timing signal from said voltage sense signal or said current sense signal such that said trailing edge of said first timing signal is later than a turn-off time of said drive signal.

3. A switch mode power supply (SMPS) current regulation system as claimed in claim 1 wherein said timing signal generator is configured to generate a leading edge of said first timing signal from said voltage sense signal or said current sense signal such that said leading edge of said first timing signal is later than a turn-on time of said drive signal.

4. A switch mode power supply (SMPS) current regulation system as claimed in claim 1 wherein said timing signal generator is configured to generate a leading edge of said second timing signal from a trailing edge of said first timing signal.

5. A switch mode power supply (SMPS) including the SMPS current regulation system of claim 1.

6. A switch mode power supply (SMPS) current regulation system, said SMPS including a transformer with at least a primary winding coupled to an input of the SMPS and a secondary winding coupled to an output of the SMPS, the SMPS having a switching device to switch power to said primary winding responsive to a drive signal, the current regulation system comprising:
   a current sense input to receive a current sense signal sensing a current on said primary winding of said transformer;
   a voltage sense input to receive a voltage sense signal from said primary winding or an auxiliary winding of said transformer;
   a drive signal input to receive said drive signal;
   a timing signal generator coupled to said voltage sense input and to said drive signal input to generate a first timing signal indicating a duration of a period for which current is flowing through said primary winding and a second timing signal indicating a duration of a period for which current is flowing through said secondary winding, wherein one or both of said first timing signal and said second timing signal are generated responsive to said voltage sense signal or said current sense signal; and
   an output current regulator coupled to said current sense input and to said timing signal generator to provide an output current regulation signal responsive to an average of said current sense signal multiplied by a ratio of said second timing signal to said first timing signal,
   wherein said timing signal generator is configured to generate a flyback signal which identifies a timing of a voltage-level-crossing or turning point of said voltage sense signal, and a timing offset signal indicating a timing difference between said voltage-level-crossing or turning point and a reset point of said transformer, and to generate a trailing edge of said second timing signal from said timing of said voltage-level-crossing or turning point identified by said flyback signal offset by said timing difference indicated by said timing offset signal.

7. A switch mode power supply (SMPS) including the SMPS current regulation system of claim 6.

8. A switch mode power supply (SMPS) current regulation system, said SMPS including a transformer with at least a primary winding coupled to an input of the SMPS and a secondary winding coupled to an output of the SMPS, the SMPS having a switching device to switch power to said primary winding responsive to a drive signal, the current regulation system comprising:
   a current sense input to receive a current sense signal sensing a current on said primary winding of said transformer;
   a voltage sense input to receive a voltage sense signal from said primary winding or an auxiliary winding of said transformer;
   a drive signal input to receive said drive signal;

a timing signal generator coupled to said voltage sense input and to said drive signal input to generate a first timing signal indicating a duration of a period for which current is flowing through said primary winding and a second timing signal indicating a duration of a period for which current is flowing through said secondary winding, wherein one or both of said first timing signal and said second timing signal are generated responsive to said voltage sense signal or said current sense signal; and an output current regulator coupled to said current sense input and to said timing signal generator to provide an output current regulation signal responsive to an average of said current sense signal multiplied by a ratio of said second timing signal to said first timing signal, wherein said timing signal generator comprises a knee-detector, coupled to said voltage sense input to provide a knee-detection signal identifying a knee point on said voltage sense signal, said knee-detector comprising one or both of a decaying or leaky peak detector and a comparator, said timing signal generator being configured to generate said second timing signal using said knee-detection signal, wherein said knee-detection signal identifies both a real knee point on said voltage sense signal and false knee points, and wherein said timing signal generator further comprises a mechanism to ignore said false knee points.

9. A switch mode power supply (SMPS) current regulation system as claimed in claim 8 wherein said mechanism to ignore said false knee points comprises a dual slope integrator, triggered to integrate in a first direction by detection of a said real or false knee point and triggered to integrate in a second, opposite direction by a fiducial point on said voltage sense waveform following said real knee point.

10. A switch mode power supply (SMPS) current regulation system as claimed in claim 9 wherein said timing signal generator is configured to generate an integration time signal having a value corresponding to a duration of said integration in said second opposite direction, and wherein said generation of said second timing signal comprises offsetting a timing of said fiducial point by said value of said integration time signal.

11. A switch mode power supply (SMPS) current regulation system as claimed in claim 10 wherein said second timing signal is a bipolar signal having a first polarity until a time of said fiducial point, and wherein said offsetting comprises adding, with a second opposite polarity, said value of said integration time signal.

12. A switch mode power supply (SMPS) including the SMPS current regulation system of claim 8.

13. A method of estimating the output current of a switch mode power supply (SMPS) using primary-side sensing, said SMPS including a transformer with at least a primary winding coupled to an input of the SMPS and a secondary winding coupled to an output of the SMPS, the SMPS having a switching device to switch power to said primary winding responsive to a drive signal, the method comprising:

sensing a current (CS) through said primary winding:

determining a first time (T0) representing a time for which said current is flowing through said primary winding;

determining a second time (T1) representing a time for which said current is flowing in said secondary winding; and determining an estimate of said output current from said sensed current, said first time and said second time; and further comprising:

sensing a secondary side voltage (VS) using said primary winding or an auxiliary winding of said transformer; and wherein at least one of said determining of said first time and said second time comprises correcting a value of a said time responsive to said sensed secondary side voltage (VS), wherein said correcting a value of a said time includes correcting said first time, and wherein said correcting of said first time comprises sensing a time when said sensed current through said primary winding has fallen to substantially zero and extending said first time beyond a time of switching off of said drive signal to said time when said sensed current has fallen to substantially zero.

14. A method as claimed in claim 13 wherein said correcting a value of a said time includes correcting said second time, wherein said determining of said second time comprises detecting a knee point of said sensed secondary side voltage, and wherein said detecting of said knee point includes detecting a real knee point and false knee points in said sensed secondary side voltage, and wherein said correcting of said second time comprises determining a longer time than a time determined by said real knee point such that said false knee points are ignored and then correcting said longer time using said sensed secondary side voltage to determine said second time.

15. A method as claimed in claim 14 wherein said determining of said longer time comprises detecting a voltage-level-crossing or turning point of said sensed secondary side voltage, and wherein said correcting comprises offsetting a second time value representing said second time using a time interval between said real knee point and said voltage-level-crossing or turning point.

16. A method as claimed in claim 15 wherein said determining of said time interval between said real knee point and said voltage-level-crossing or turning point comprises integrating a substantially fixed start value in a first direction, initiating said integrating each time either said real knee point or a said false knee point is detected, ceasing said integrating at a time of said voltage-level-crossing or timing point and then integrating in a second direction opposite to said first direction from a point reached by said integrating in said first direction towards a substantially fixed end value, and wherein said time interval between said real knee point and said voltage-level-crossing or turning point has a duration determined by a duration of said integrating in said second direction.

17. A method as claimed in claim 15 wherein said second time is represented by a bipolar value, and wherein said offsetting comprises adding to said second time value a value representing said time interval between said real knee point and said voltage-level-crossing or turning point, wherein said second time value and said value representing said time interval between said real knee point and said voltage-level-crossing or turning point have opposite polarities.

18. A method as claimed in claim 13 wherein said determining of said second time comprises detecting a knee point of said sensed secondary side voltage using a decaying or leaky peak detector.

* * * * *